April 12, 1927.
F. FENTON
1,624,725
METHOD OF TREATING CURED INNER TUBES FOR PNEUMATIC TIRES
Filed Aug. 10, 1926
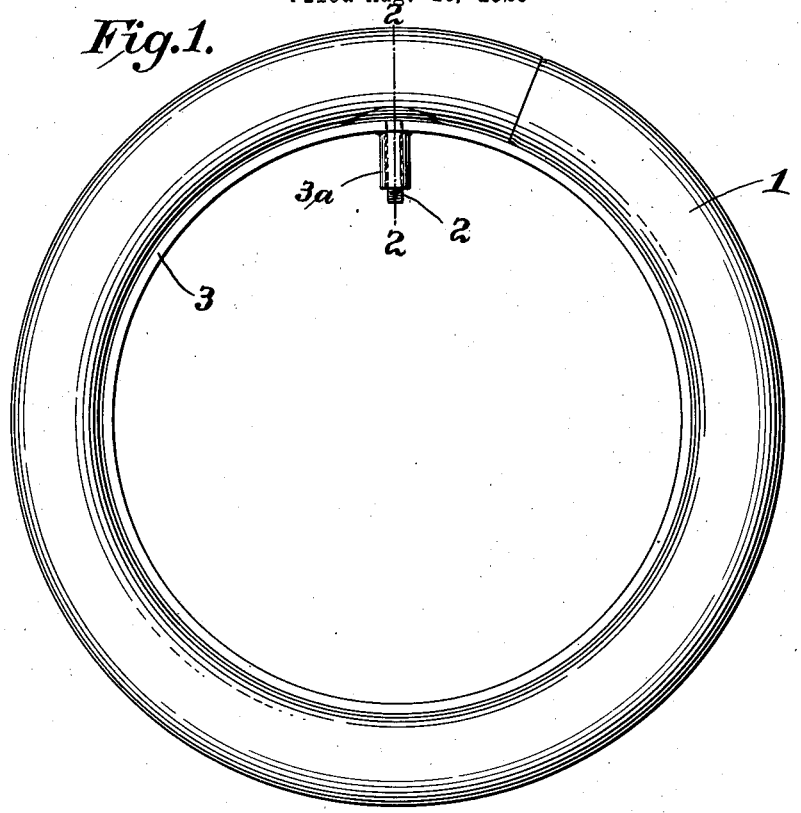
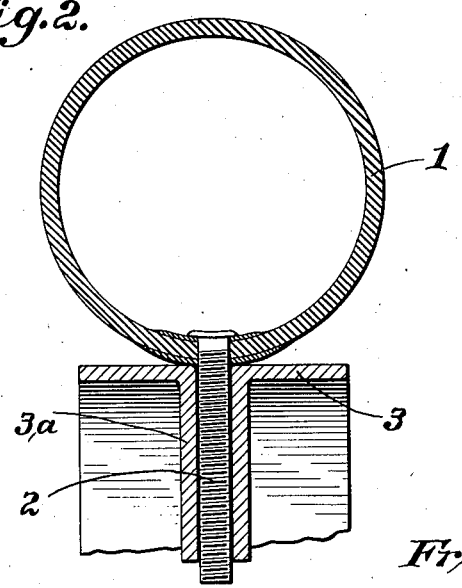
Inventor:
Frank Fenton,
by Spear Middleton Donaldson & Hall
Attys.

Patented Apr. 12, 1927.

1,624,725

UNITED STATES PATENT OFFICE.

FRANK FENTON, OF AKRON, OHIO, ASSIGNOR TO THE MILLER RUBBER COMPANY, OF AKRON, OHIO, A CORPORATION OF OHIO.

METHOD OF TREATING CURED INNER TUBES FOR PNEUMATIC TIRES.

Application filed August 10, 1926. Serial No. 128,461.

My present invention relates to an improved method of manufacturing inner tubes for pneumatic tires and while designed more especially for use in making large heavy duty type of tubes, is not limited to these.

In the manufacture of tubes it is customary to first make and vulcanize these with open ends. The necessary inflating valve carrying stem is applied or inserted before the ends of the tube are spliced together to make it endless. It frequently is found, after such splicing, that when the tube is inflated the valve will be off center or will not lie in the central plane of the tube which produces a strain or distortion of the tube in use, and also causes difficulty in entering the valve stem in the hole in the wheel felly.

The present invention aims to provide a method of remedying this defect, and consists in supporting the inflated annular tube so that it will be freely movable while the valve stem is maintained in the median plane of the tube, heating the tube and thereafter cooling it while so held.

The invention further consists in or comprises a ring for supporting the tube having a stem receiving and holding guide arranged in the median plane of the ring.

In order that the invention may be more readily understood reference is made to the accompanying drawing in which:—

Fig. 1 is a side elevation of a tube supported by a carrying ring for treatment according to my improved process, and Fig. 2 is a section on line 2—2 of Fig. 1.

In proceeding according to my aforesaid method after the tube 1 has had its ends spliced and the valve stem 2 applied thereto in the customary manner, I support it so that it will be freely movable in all its parts but with the valve stem maintained in the median plane. This may be accomplished by providing a ring 3 having preferably an outer surface of cylindrical form and a radially arranged stem receiving guide 3ª. After the tube has been inflated it is placed on the ring as shown in the drawings with the valve stem located in the guide. A plurality of rings thus supplied with tubes may be placed on racks of any suitable form and placed in heaters of the customary type, or such rings may be supported in the heaters in any suitable manner, and subjected to a dry heat of preferably about 180° F., being allowed to remain in the heater until the tubes are thoroughly heated and any strain on the rubber relieved. The carrying rings are then removed from the heaters and the tubes allowed to cool while retained on the rings. On removal of a tube from its ring it will be found that the stem will then lie in the median plane of the tube and a perfect article secured. The frictional contact of the tube with the rim does not offer sufficient resistance to preclude the various parts of the tube from adjusting themselves to relieve the strain on the rubber when the tube is heated and the cooling of the tube on the ring causes it to set in its adjusted position.

Having thus described my invention what I claim is:—

1. The herein described method of treating cured inner tubes for pneumatic tires which consists in supporting the inflated tube so that the wall thereof is free to adjust itself and with the valve stem maintained in the median plane of the tube, and then first heating the tube and subsequently allowing it to cool while so held.

2. The herein described method of treating inner tubes for pneumatic tires which consists in supporting the inflated tube so that the wall thereof is free to adjust itself and with the valve stem maintained in the median plane of the tube, and then first heating the tube to approximately 180° F. in a dry heat and subsequently allowing it to cool while so held.

3. The herein described method of treating cured inner tubes for pneumatic tires which consists in supporting the inflated cured tube on an annular ring having a radial valve stem receiving guide arranged in the median plane of the ring and first heating the cured tube and thereafter allowing it to cool while supported by the ring.

In testimony whereof I affix my signature.

FRANK FENTON.